United States Patent
Cooper et al.

(10) Patent No.: US 10,710,918 B1
(45) Date of Patent: Jul. 14, 2020

(54) METHOD OF MANUFACTURING A HOLLOW GLASS ARTICLE HAVING A CONTAINER SHAPE

(71) Applicant: Owens-Brockway Glass Container Inc., Perrysburg, OH (US)

(72) Inventors: Scott P Cooper, Maumee, OH (US); William Pinc, Waterville, OH (US); Olexander Manulyk, Oshawa (CA)

(73) Assignee: Owens-Brockway Glass Container Inc., Perrysburg, OH (US)

( * ) Notice: Subject to any disclaimer, the term of this patent is extended or adjusted under 35 U.S.C. 154(b) by 308 days.

(21) Appl. No.: 15/898,790

(22) Filed: Feb. 19, 2018

(51) Int. Cl.
| | |
|---|---|
| *C03B 19/06* | (2006.01) |
| *C03B 5/00* | (2006.01) |
| *C03B 3/02* | (2006.01) |
| *C03B 9/193* | (2006.01) |
| *C03C 3/078* | (2006.01) |

(52) U.S. Cl.
CPC .............. *C03B 5/005* (2013.01); *C03B 3/023* (2013.01); *C03B 9/1932* (2013.01); *C03B 19/06* (2013.01); *C03C 3/078* (2013.01)

(58) Field of Classification Search
CPC ........ C03B 19/06; C03B 19/063; C03B 19/09
See application file for complete search history.

(56) References Cited

U.S. PATENT DOCUMENTS

| | | |
|---|---|---|
| 3,145,090 A | 8/1964 | Buckner et al. |
| 3,837,825 A | 9/1974 | Loxley et al. |
| 3,883,337 A | 5/1975 | Helgesson et al. |
| 3,955,989 A | 5/1976 | Nakamura |
| 4,902,328 A | 2/1990 | Knauff et al. |
| 5,250,474 A | 10/1993 | Siebers |
| 6,620,747 B2 | 9/2003 | Schweiger |
| 8,733,127 B2 | 5/2014 | Yamagata et al. |
| 2003/0196456 A1 | 10/2003 | Linhart |
| 2006/0101856 A1 | 5/2006 | Lehman et al. |
| 2008/0076655 A1* | 3/2008 | Eamsiri ............... C03B 19/06 501/32 |
| 2011/0081458 A1 | 4/2011 | McDonald |
| 2014/0191448 A1 | 7/2014 | Binhussain et al. |

FOREIGN PATENT DOCUMENTS

| | | |
|---|---|---|
| GB | 749924 | 6/1956 |
| GB | 1114196 | 5/1968 |
| JP | S6374936 A | 4/1988 |

(Continued)

*Primary Examiner* — Cynthia Szewczyk (57) ABSTRACT

A method of making a hollow container-shaped glass article composed of soda-lime-silica glass includes forming a particulate feedstock comprised of pulverized soda-lime-silica cullet particles into a hollow monolithic glass container preform without melting the cullet particles. The hollow monolithic glass container preform has a container shape that includes a wall defining an interior containment space and an opening to the interior containment space and, upon formation, has a temperature above the glass transition temperature of the soda-lime-silica glass. The hollow monolithic glass container preform is eventually cooled into a hollow, amorphous soda-lime-silica glass article, such as a partially-formed container or a finished container, that retains the previously-established container shape.

25 Claims, 5 Drawing Sheets

(56) References Cited

FOREIGN PATENT DOCUMENTS

| | | |
|---|---|---|
| JP | S6452634 A | 2/1989 |
| JP | H02120254 A | 5/1990 |
| JP | H02129044 A | 5/1990 |
| JP | 3054131 A | 3/1991 |
| JP | H05229839 A | 9/1993 |
| JP | 11043336 A | 2/1999 |
| JP | H11236259 A | 8/1999 |
| JP | 2006315910 A2 | 11/2006 |
| JP | 2006321691 A2 | 11/2006 |
| WO | WO2004/103921 A1 | 12/2004 |

\* cited by examiner

METHOD OF MANUFACTURING A HOLLOW GLASS ARTICLE HAVING A CONTAINER SHAPE

The present disclosure is directed to hollow container-shaped articles composed of soda-lime-silica glass and, more particularly, to a method of making a hollow soda-lime-silica glass article in the shape of a container via a sintered hollow monolithic glass container preform derived from a particulate feedstock that comprises pulverized cullet particles.

BACKGROUND AND SUMMARY OF THE DISCLOSURE

Soda-lime-silica glass is an amorphous inorganic material comprised of a network of spatially cross-linked silicon dioxide ($SiO_2$), sodium oxide ($Na_2O$), and calcium oxide (CaO), plus other optional oxide and non-oxide materials. The silica component is the largest oxide by weight and constitutes the primary network forming material of the glass. The sodium oxide and calcium oxide components are glass network modifiers that serve, respectively, as a fluxing agent and a stabilizer. In particular, the sodium oxide component reduces the viscosity of the glass at a given temperature and makes the glass more workable, and the calcium oxide component reduces the viscosity of the glass at high temperatures while also adding chemical resistance (most notably to water) to the glass. Soda-lime-silica glass has a chemical composition that includes 60 wt % to 80 wt % silica, 8 wt % to 18 wt % sodium oxide, 5 wt % to 15 wt % calcium oxide, and optionally 0-2 wt % aluminum oxide ($Al_2O_3$), 0-4 wt % magnesium oxide (MgO), 0-1.5 wt % potassium oxide ($K_2O$), 0-1 wt % iron oxide ($Fe_2O_3$), 0-0.5 wt % titanium oxide ($TiO_2$), and 0-0.5 wt % sulfur trioxide ($SO_3$), among others. Owing to its good chemical stability, workability, and cost, soda-lime-silica glass is an attractive option for three-dimensionally-shaped glass articles including containers such as bottles and jars.

Glass articles composed of soda-lime-silica glass have long been made by a melt processing route that involves melting a pre-formulated batch of reactant materials at high temperatures into workable molten glass with the proper chemistry as well as the proper chemical and thermal consistency before conducting additional downstream glass forming operations. The batch reactant materials have conventionally included a physical mixture of virgin raw materials and, optionally, recycled glass materials known in the industry as "cullet." The virgin raw materials contain quartz sand (crystalline $SiO_2$), soda ash ($Na_2CO_3$), and limestone ($CaCO_3$) in the appropriate proportionate amounts needed to attain the requisite molar ratio of $SiO_2$, $Na_2O$, and CaO, respectively, in the final glass composition. Additionally, to further tailor the characteristics of the resultant glass and/or to enhance glass workability, the virgin raw materials may include small amounts of other ingredients including feldspar, which is a source of $Al_2O_3$, precursors to other glass network formers and glass network modifiers, colorants, decolorants, fining agents, and redox agents. Cullet from consumer and/or commercial products may be combined with the virgin raw materials and, if used, has typically constituted up to 80 wt % of the batch reactant materials.

In most high-volume, melt process glass manufacturing operations, the batch reactant materials are melted by a continuous process in a refractory brick-lined furnace at temperatures above 1200° C. To begin, the batch reactant materials are introduced, or "charged," at a controlled rate into a primary melting section of the furnace using any method of batch charging such as a screw conveyor, mechanical pushing mechanism or other. Specifically, the batch reactant materials are deposited as a batch blanket on top of a flowing molten glass bath, which is heated and maintained in a molten state by the combustion of fuel oil or natural gas in the space above the bath through the operation of burners (e.g., a regenerative side-port burner configuration). Over time, the various batch reactant materials are melted through dissolution, decomposition, and/or melting reactions at temperatures that can exceed 1500° C. The various batch reactant materials progress through several intermediate melt phases and eventually become chemically integrated into the flowing molten glass bath as the bath moves by convection through the primary melting section of the furnace towards a refining section on the opposite side of a submerged throat. In the refining section of the furnace, the molten glass bath is refined at a temperature between 1400° C. and 1550° C. to remove entrained gas bubbles with or without the help of chemical refining agents. Gas bubbles are primarily introduced into the molten glass bath when, among other mechanisms, carbonate-containing batch materials such as $Na_2CO_3$ and $CaCO_3$ decompose during melting of the batch reactant materials to evolve carbon dioxide.

The refining section of the furnace yields chemically homogenized and refined molten glass having the correct chemistry as needed for further processing into a glass article. To that end, when manufacturing hollow glass articles such as glass containers, molten glass is removed from the furnace at the refining section and transported through a forehearth to a glass feeder. The forehearth is an extended channel that functions to cool the molten glass at a controlled rate to a working temperature and viscosity suitable for glass forming operations while also achieving a more uniform temperature profile within the molten glass. At the glass feeder, the conditioned molten glass is formed into streams that are sheared into molten glass gobs of a predetermined weight. The molten glass gobs are then delivered by gob delivery systems into individual section machines where they are fashioned first into partially-formed containers known as parisons and then into finished glass containers by the blow-and-blow method or the press-and-blow method. Upon emerging from the individual section machine, the finished glass container is cooled to preserve its shape and then annealed in one or more annealing lehrs, typically at a temperature between 550° C. and 600° C., to remove internal residual stress points within the container. Any of a variety of external coatings may be applied to the exterior container surface before and/or after annealing, if desired.

The manufacture of glass containers by the melt processing route is thus a demanding process in terms of time and energy consumption. The melting and refining processes that occur in the furnace require the greatest investment of time and energy as each unit of batch reactant materials that corresponds to a finished glass container has a residence time in the furnace that typically exceeds 24 hours. Such a long residence time is primarily due to the initially slow dissolution rate of crystalline quartz sand, the time needed to homogeneously chemically mix the melted batch reactant materials into the molten glass bath—especially the quartz sand which has a tendency to agglomerate into $SiO_2$-rich regions known as "cord"—and the time needed to refine the molten glass to effectively remove entrained gas bubbles before further downstream processing can occur. And, while the substitution of cullet for virgin raw materials in the batch reactant materials can accelerate the melting of the reactant materials and lower furnace energy consumption, mainly because the cullet has already been formed into a glass product and will not release carbon dioxide when melted, current melt processing practices still typically require furnace residence times of at least 24 hours. This is because cullet has a tendency to be contaminated with metals, glues, and other organic compounds, and is sometimes difficult to uniformly mix with virgin raw materials into the flowing molten glass bath, and also because bulk purchases of cullet are subject to great variations in color and other characteristics.

The present disclosure describes a way to manufacture a hollow glass article composed of soda-lime-silica glass and having a container shape. The method involves forming the hollow glass article from a particulate feedstock comprised predominantly of soda-lime-silica cullet particles while avoiding the conventional melt processing route. The disclosed method, in particular, forms the hollow glass article composed of soda-lime-silica glass without melting the cullet particles in the particulate feedstock, but, rather, by mechanical working and solid-state sintering operations that are carried out at temperatures that do not exceed 850° C. Because the cullet particles are fused in the solid-state during sintering, as opposed to being melted and refined in a furnace, the disclosed method consumes significantly less energy from start to finish, thus reducing the carbon footprint of each manufactured hollow glass article compared to conventional melt processing. The disclosed method additionally lowers capital equipment and maintenance costs, simplifies raw material handling, and dispenses with the need to handle molten materials during formation of the hollow glass article. These attained benefits can drastically change the glass container manufacturing infrastructure.

The present disclosure embodies a number of aspects that can be implemented separately from or in combination with each other to make a hollow glass article having a container shape and composed of soda-lime-silica glass. The glass composition associated with the soda-lime-silica glass article comprises 60 wt % to 80 wt % $SiO_2$, 8 wt % to 18 wt % $Na_2O$, and 5 wt % to 15 wt % CaO, plus other optional oxide components such as, for example, aluminum oxide, magnesium oxide, and/or potassium oxide, depending on the composition of the soda-lime-silica cullet used to prepare the particulate feedstock. The glass transition temperature of the soda-lime-silica glass lies within the range of 510° C. to 600° C. The hollow glass container-shaped article formed by practices of the disclosed method can take on a variety of three-dimensional container-shaped configurations including, for example, a partially-formed container (i.e., a parison) or a finished container in the form of a bottle or jar.

According to one aspect of the present disclosure, a method of making a hollow glass article composed of soda-lime-silica glass comprises pulverizing soda-lime-silica cullet to obtain cullet particles of a reduced particle size and incorporating those particles into a particulate feedstock. The particulate feedstock is then formed into a hollow monolithic glass container preform without melting the cullet particles contained in the feedstock. The hollow monolithic glass container preform has a temperature above the glass transition temperature of the soda-lime-silica glass, but not in excess of 850° C., and further has a container shape that includes a wall defining an interior containment space and an opening to the interior containment space. After being formed, the hollow monolithic glass container preform is cooled into a hollow, amorphous, soda-lime-silica glass article that retains the previously-established container shape.

According to another aspect of the present disclosure, a method of making a hollow glass article composed of soda-lime-silica glass comprises incorporating soda-lime-silica cullet particles, regardless of how they are obtained, into a particulate feedstock. The particulate feedstock is then pressed into a compressed solid green-body. Thereafter, the compressed solid green-body is sintered at a sintering temperature above the glass transition temperature of the soda-lime-silica glass, but not in excess of 850° C., to fuse the compressed solid green-body into a solid monolithic glass body without causing recrystallization within the glass body. The solid monolithic glass body is then mechanically deformed into a hollow monolithic glass container preform having a container shape that includes a wall defining an interior containment space and an opening to the interior containment space. After being formed, the hollow monolithic glass container preform is cooled into a hollow, amorphous soda-lime-silica glass article that retains the previously-established container shape.

According to still another aspect of the present disclosure, a method of making a hollow glass article composed of soda-lime-silica glass comprises incorporating soda-lime-silica cullet particles, regardless of how they are obtained, into a particulate feedstock. The particulate feedstock is then pressed into a compressed hollow green-body that generally corresponds in size and shape to the hollow monolithic glass container preform sought to be formed. Thereafter, the compressed hollow green-body is sintered at a sintering temperature above the glass transition temperature of soda-lime-silica glass, but not in excess of 850° C., to fuse the compressed hollow green-body into a hollow monolithic glass container preform without causing recrystallization within the preform. The resultant hollow monolithic glass container preform has a container shape that includes a wall defining an interior containment space and an opening to the interior containment space. After being formed, the hollow monolithic glass container preform is cooled into a hollow, amorphous soda-lime-silica glass article that retains the previously-established container shape.

BRIEF DESCRIPTION OF THE DRAWINGS

The disclosure, together with additional objects, features, advantages, and aspects thereof, will be best understood from the following description, the appended claims, and the accompanying drawings, in which:

DETAILED DESCRIPTION

The disclosed method of making a hollow container-shaped glass article composed of soda-lime-silica glass predominately consumes cullet and offers an alternative manufacturing route to conventional melt processing. More particularly, as will be further explained below, pulverized soda-lime-silica cullet particles make up at least 95 wt % and, preferably, 100 wt %, of a particulate feedstock that is used to form the hollow glass article, which is an appreciably higher percentage than a conventional batch reactant material formulation. And since the particulate feedstock is comprised predominately of cullet particles, it can be softened and solid-state fused into a monolithic glass structure from a compressed green-body at temperatures that do not exceed 850° C. Additionally, the resultant glass that constitutes the hollow glass article is amorphous in nature and can achieve greater than 99% of the theoretical density of glass formed by the melt processing route as well as acceptable flexural strength and fracture toughness properties. The disclosed method thus provides an avenue to form a hollow, soda-lime-silica glass article having a container shape that is less time and energy intensive than conventional melt processing practices on a per article basis without being accompanied by a substantial sacrifice in the mechanical properties of the formed glass.

Figure 3A:
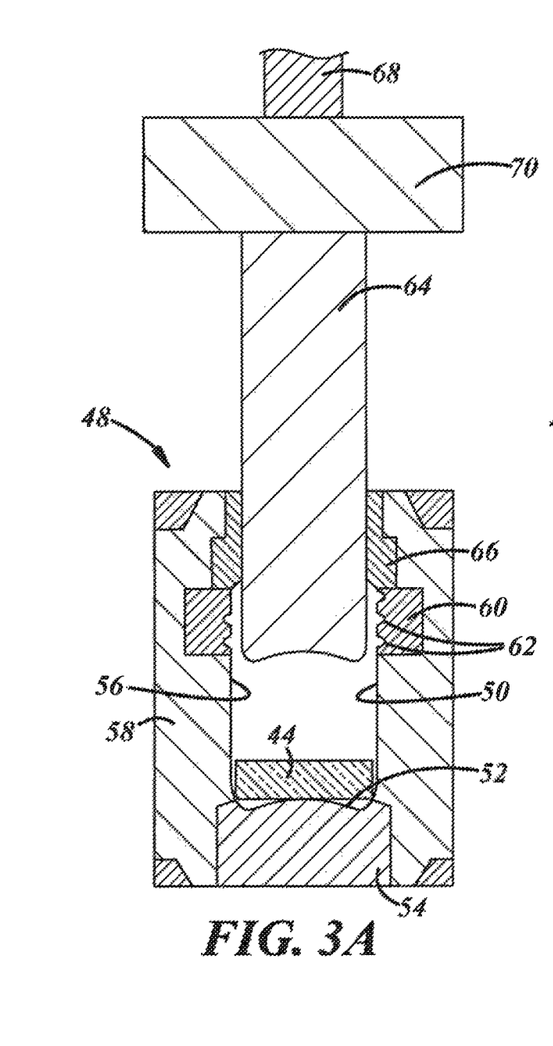
FIG. 3A is a side cross-sectional view of a generic hot-stamping apparatus showing the solid monolithic glass body loaded into a mold cavity prior to being mechanically deformed by a retractable plunger into a hollow monolithic glass container preform having a container shape according to one embodiment of the disclosure.
Figure 3B:
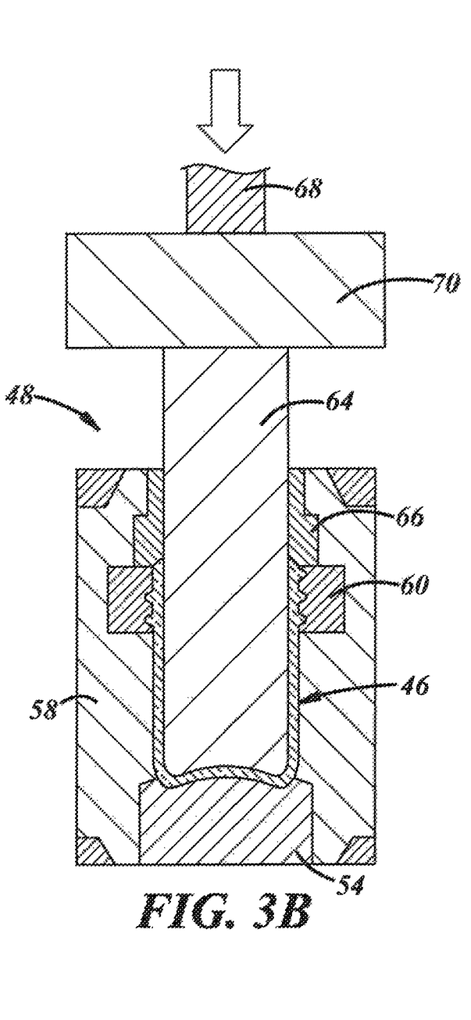
FIG. 3B is a side cross-sectional view of the generic hot-stamping apparatus showing the solid monolithic glass body being mechanically deformed by the plunger into the hollow monolithic glass container preform according to one embodiment of the disclosure.
Figure 3C:
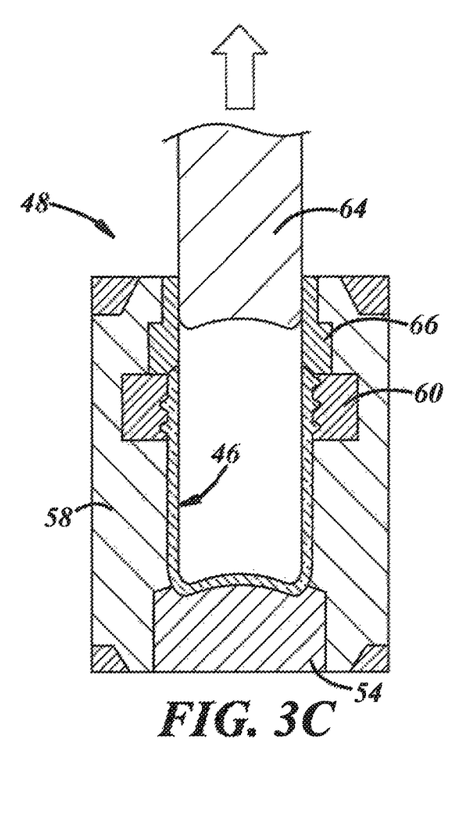
FIG. 3C is a side cross-sectional view of the generic hot-stamping apparatus showing the hollow monolithic glass container preform following retraction of the plunger according to one embodiment of the disclosure.
Figure 4A:
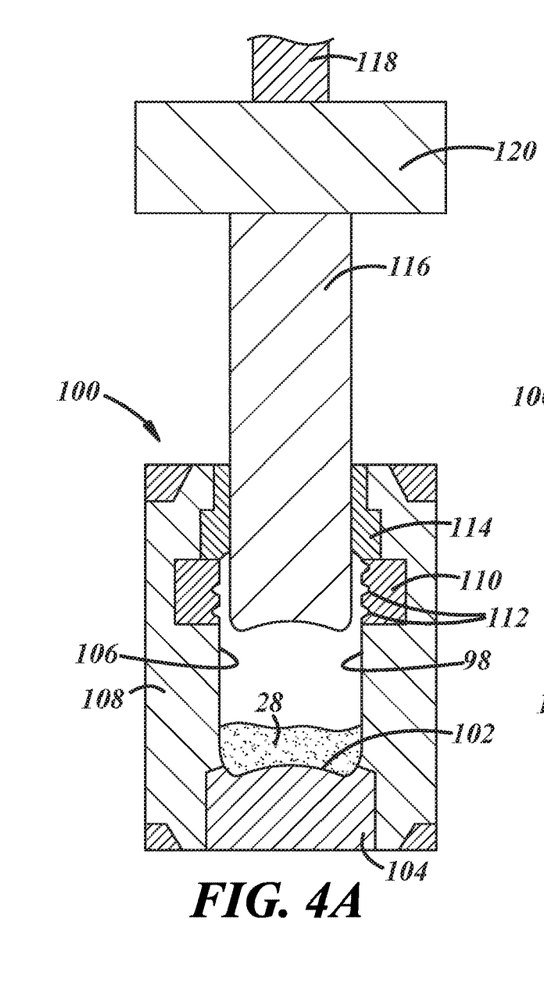
FIG. 4A is a side cross-sectional view of a generic cold-stamping apparatus showing the particulate feedstock loaded into a mold cavity prior to being pressed by a retractable plunger into a compressed hollow green-body according to one embodiment of the disclosure.
Figure 4B:
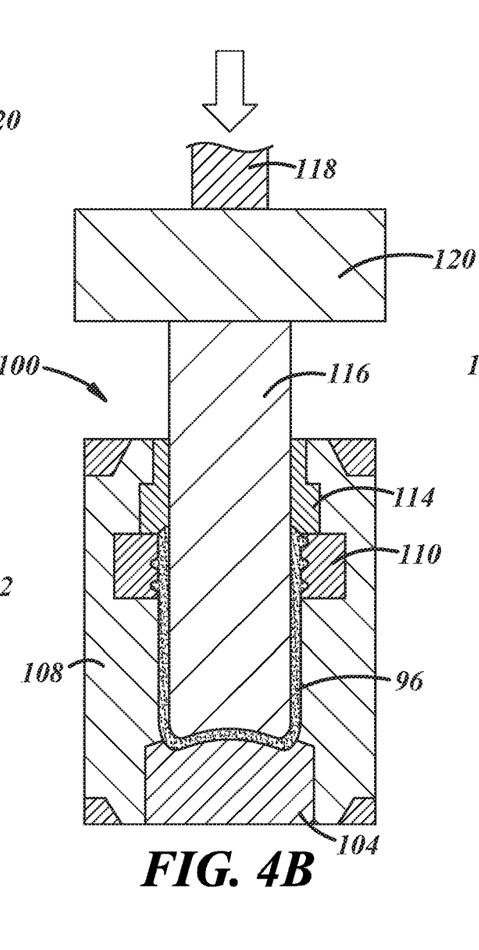
FIG. 4B is a side cross-sectional view of the generic cold-stamping apparatus showing the particulate feedstock being pressed by the plunger into the compressed hollow green-body according to one embodiment of the disclosure.
Figure 4C:
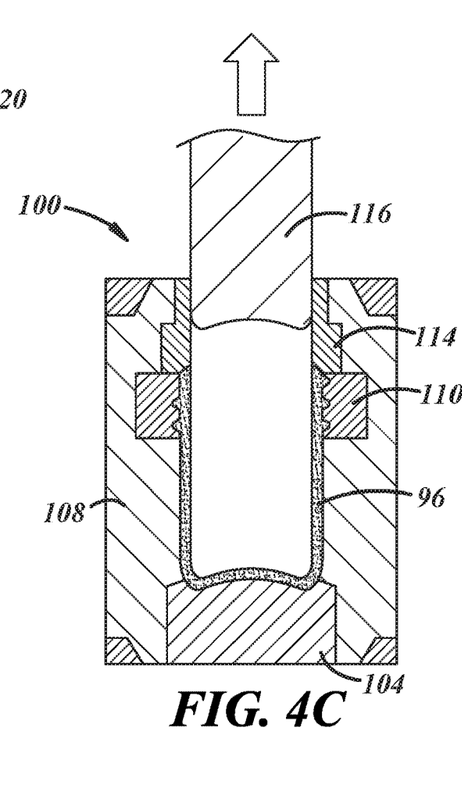
FIG. 4C is a side cross-sectional view of the generic cold-stamping apparatus showing the compressed hollow green-body following retraction of the plunger according to one embodiment of the disclosure.
Figure 5:
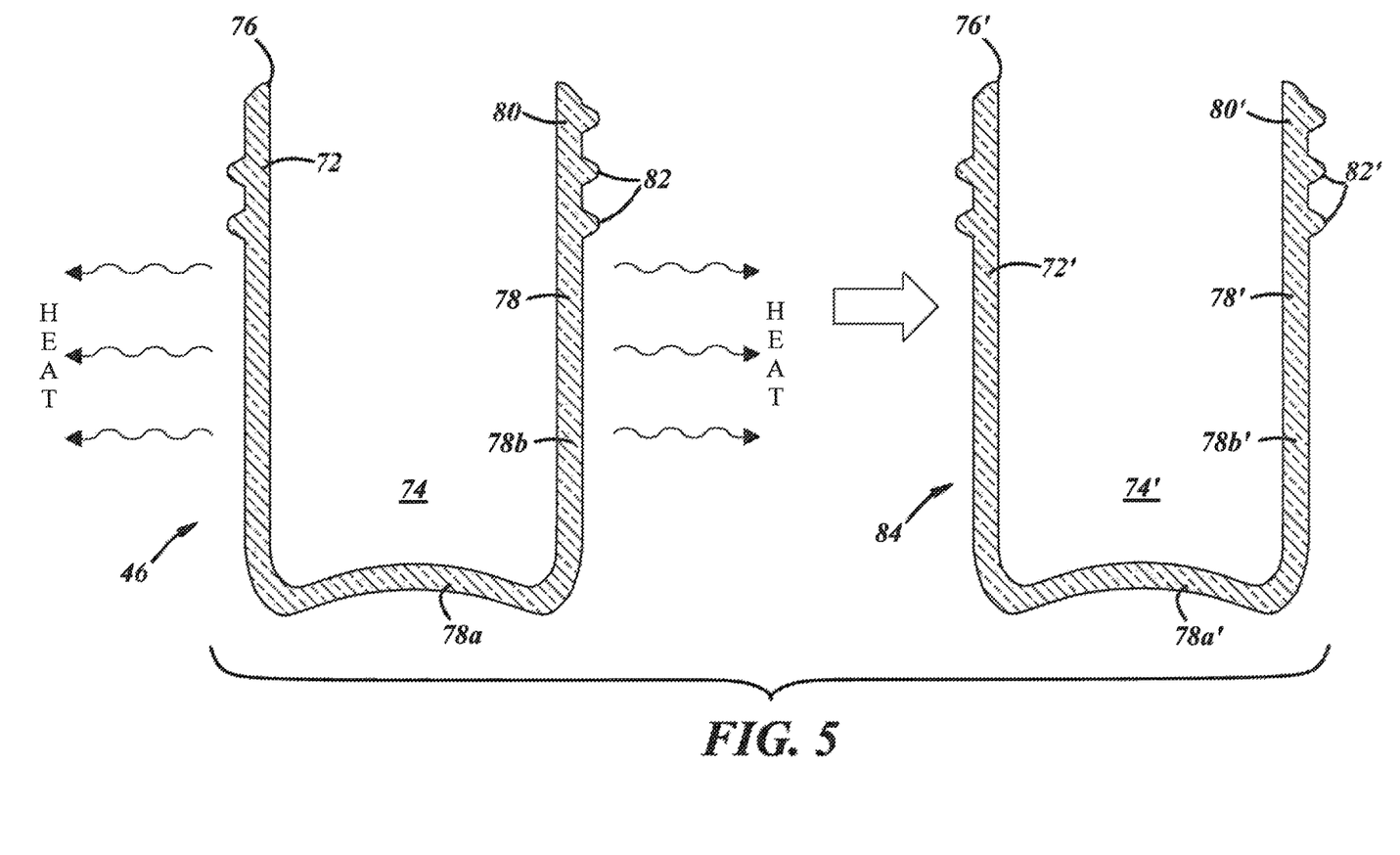
FIG. 5 is a representative broken away perspective view of the hollow monolithic glass container preform being cooled into a hollow glass article composed of soda-lime-silica glass and having a container shape according to practices of the method set forth in the present disclosure.

Referring now to FIGS. 1-5, the disclosed method 10 of making a hollow glass article 84 (FIG. 5) composed of soda-lime-silica glass and having a container shape is illustrated. The hollow glass article 84 depicted in the drawings and, in particular, FIG. 5, is in the form of a finished glass container configured as a jar. The container shape of the hollow glass article 84, however, is not limited to a finished glass container (e.g., a jar or a bottle). In an alternative embodiment, for example, the hollow glass article 84 may be in the form of a partially-formed container known in the industry as a "parison." The "container shape" of the hollow glass article 84 thus broadly encompasses the shapes embodied in a partially-formed container and a finished container. A finished container like the jar shown in FIG. 5 does not need to undergo any additional enlargement since it has already attained its final size dimensions. A partially-formed container, on the other hand, would need to be further enlarged into a finished container. For instance, a parison formed by the disclosed method 10 may be further enlarged into a finished container by heating the parison to a temperature range between 900° C. and 1050° C. and then blowing the parison with compressed air into a finished container.

The chemical composition of the soda-lime-silica glass that constitutes the hollow glass article 84 comprises 60 wt % to 80 wt % $SiO_2$, 8 wt % to 18 wt % $Na_2O$, and 5 wt % to 15 wt % CaO, plus other optional oxide components that, if present, collectively contribute less than 10 wt % of the glass composition. Additionally, the soda-lime-silica glass has a glass transition temperature (Ts) between 510° C. and 600° C. The exact chemical composition and glass transition temperature of the soda-lime-silica glass produced by the disclosed method 10 depends on the composition of the cullet that is used to prepare the particulate feedstock. Such attributes of the glass can be precisely determined from standard analyses of the cullet and/or are readily observable during formation of the hollow glass article 84. As shown in the process flow diagram of FIG. 1, the disclosed method 10 may include a cullet pulverizing step 12, a particulate feedstock incorporation step 14, a container preform forming step 16, and a container preform cooling step 18. There are multiple ways to practice the method 10 including, without limitation, the two specific embodiments discussed in more detail below.

Figure 1:
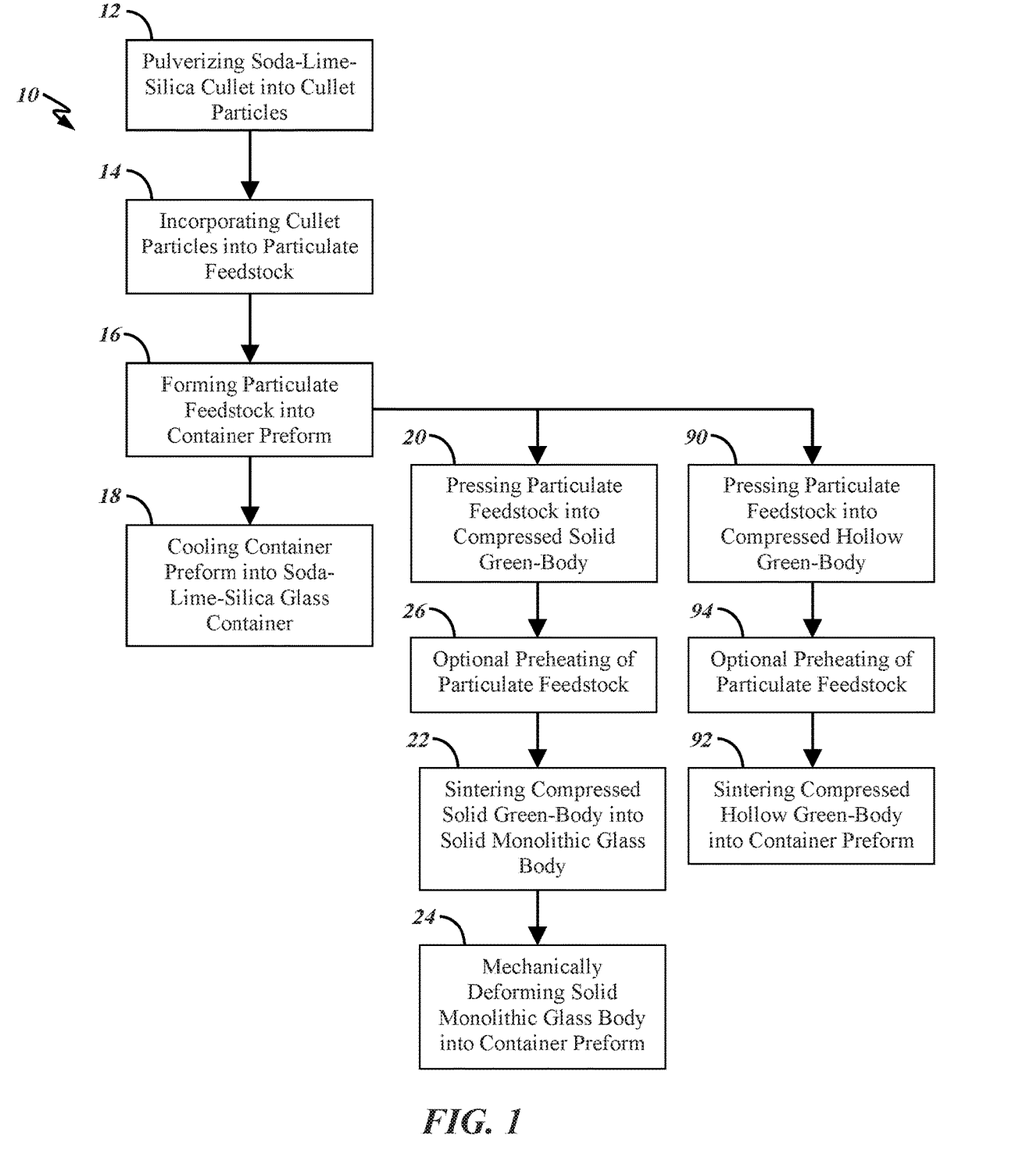
FIG. 1 is a process flow diagram that generally outlines the method of the present disclosure along with several illustrative embodiments for carrying out the disclosed method.

The cullet pulverizing step 12 involves pulverizing soda-lime-silica cullet (i.e., recycled glass) to obtain cullet particles of a reduced particle size. The soda-lime-silica cullet can be purchased in large-quantity lots, supplied from internal glass manufacturing operations, or acquired by some other means. The acquired cullet may be in the form of broken pieces, shards, or smaller particles, and as a whole generally has a size distribution that needs to be adjusted downward to carry out the disclosed method 10. A number of techniques may be employed to pulverize the cullet into cullet particles including, for example, crushing and/or grinding. In a preferred implementation of the pulverizing step 12, the soda-lime-silica cullet is jaw crushed, roll crushed, and/or ball milled to obtain cullet particles of the appropriate size. When choosing what size is appropriate for the cullet particles, the possible differences in the coefficient of thermal expansion of the individual cullet particles—which often range from $84 \times 10^{-7}$ °$C.^{-1}$ to $90 \times 10^{-7}$ °$C.^{-1}$—should be considered with the goal of minimizing residual stress between the particles when they are later sintered together. To that end, the more variance in chemical composition that is or may be present amongst the soda-lime-silica cullet—which coincides with a greater chance for differences in thermal expansion coefficients—the smaller the pulverized cullet particles should be in size, as described in more detail below.

The soda-lime-silica cullet that is pulverized in the pulverizing step 12 may be ecology cullet, single source cullet, or a combination of both. Ecology cullet refers to post-consumer cullet that may not be uniform in glass composition, meaning that glass compositional variances may exist within the cullet since the cullet is most likely sourced from a variety of glass plants. For example, ecology cullet includes post-consumer recycled glass from municipal and/ or commercial recycling efforts including glass from bottles, glassware, windows, and solar panels, and may also include post-industrial recycled glass from multiple sources such as different internal and/or external glass manufacturing plants. Not only does ecology cullet typically exhibit variances in glass composition within the soda-lime-silica variety, but it may include contaminants such as paper, plastic, adhesives, ceramics, bottle caps, dirt, and other impurities found in a post-consumer or post-industrial waste glass stream. Single source cullet, on the other hand, refers to a batch or collection of cullet that is fairly uniform in glass composition such as, for example, post-industrial waste glass from the same internal or external glass manufacturing plant. Such cullet is deemed to have a fairly uniform glass composition because the cullet is obtained from internally generated glass which, in turn, is produced by a process that has a consistent glass composition that satisfies tight manufacturing and industry accepted tolerances.

The pulverized cullet particles obtained in the pulverizing step 12 may originate entirely from ecology cullet. Ecology cullet is a convenient and economical type of cullet since it can be purchased in bulk on the commercial market at competitive prices. But because it may be subject to glass compositional variances and is normally intermixed with foreign contaminants, ecology cullet is preferably pulverized to a sub-millimeter particle size in order to minimize residual internal stresses within the hollow glass article 84. Such an effort to minimize residual internal stresses stems from the fact that chemical compositional variances within glass can give rise to variations in the coefficient of thermal expansion. In that regard, when two or more pieces of glass with different coefficients of thermal expansion are fused together and subsequently cooled to a temperature below the glass transition temperature, thermal stress develops, with the amount of thermal stress being related to the degree of difference between the coefficients of thermal expansion. By reducing the particle size of the cullet particles, the area over which the thermal stress acts is also reduced, thus resulting in a more even distribution of any thermal stresses. Accordingly, in a preferred approach, the pulverized cullet particles obtained from the pulverization step 12 may have particles sizes of 450 µm or less and, more specifically, 120 µm or less. In one particularly preferred embodiment, all of the pulverized cullet particles obtained from ecology cullet have particle sizes of 120 µm or less with some of those particles optionally having particles sizes of 50 µm or less. For instance, in one specific example, the pulverized cullet particles may have a size distribution in which the particle sizes of all of the cullet particles are 120 µm or less and, of those particle, anywhere from 20% to 60% have particle sizes of 50 µm or less.

Obtaining pulverized cullet particles having sizes below 450 µm, below 120 µm, or according to some other size distribution, may involve separating the cullet particles of the desired size from larger particles of nonconforming size with one or more sieves during the pulverizing step 12. For instance, the initial assortment of cullet particles removed from the pulverizing apparatus (e.g., a jaw crusher, roll crusher, or ball miller) may be fed to the one or more sieves, each of which are mesh structures that permit the passage of particles below a nominal size while blocking passage of larger particles as well as foreign contaminants. A plurality of sieves may be employed in series arrangement to obtain the cullet particles for the particulate feedstock incorporation step 14 according to a predetermined size distribution if one is desired. Any of the following types of sieves may be used alone or in combination to obtain the cullet particles of the appropriate particle size while mechanically separating them from particles of nonconforming size: a size 40 mesh sieve (nominal through-hole size 420 µm); a size 80 mesh sieve (nominal through-hole size 177 µm); a size 140 mesh sieve (nominal through-hole size 105 µm); and a size 325 mesh sieve (nominal through-hole size 44 µm). The larger particles that are captured by the one or more sieves—and thus are not carried through directly to the particulate feedstock incorporation step 14—may be returned to the pulverizing apparatus for additional pulverization and size reduction.

The pulverized cullet particles obtained in the pulverizing step 12 may alternatively originate entirely from single source cullet. Due to its internally consistent glass composition, the cullet particles obtained from single source cullet do not have to be pulverized to such a small size, as is the case with ecology cullet, since the inter-particle differences in thermal expansion coefficients are relatively small, typically within $1.6 \times 10^{-7\circ}$ $C.^{-1}$. The pulverized particles obtained in the pulverizing step 12 may, for example, have particle sizes of 1.5 mm or less without developing unacceptable internal residual stresses within the hollow glass article 84. The pulverized cullet particles can be obtained from single source cullet with any desired size distribution in the same way as previously described (e.g., a pulverizing apparatus associated with one or more sieves). In those instances in which the cullet that undergoes pulverization is a mixture of ecology cullet and single source cullet, the obtained cullet particles preferably have particle sizes that satisfy the size constraints set forth above for an all-ecology cullet lot since the compositional consistency of the single source cullet portion of the lot may be frustrated by the ecology cullet portion.

After being obtained in the pulverizing step 12, a measured amount of the cullet particles are compiled into a particulate feedstock in the particulate feedstock incorporation step 14. The measured amount of cullet particles included in the particulate feedstock is the amount needed to support formation of the hollow glass article 84 in the remaining steps of the disclosed method 10. While the exact amount of cullet particles needed can vary based on the size and shape of the hollow glass article 84, a typical particulate feedstock may include anywhere from 50 g to 1000 g of the cullet particles. The particulate feedstock may comprise at least 95 wt % of the cullet particles and, in some instances, may be 100 wt % cullet particles. An additional material that may be included in the particulate feedstock is a binder that, when present, physically binds the cullet particles together in preparation for the subsequent container preform forming step 16. The binder may be any water-dispersible binding material including, for example, polyvinyl alcohol, an acrylic emulsion, or a starch, and it is preferably present in the particulate feedstock at 0.3 wt % to 2 wt % on a solids basis including all ranges, subranges, and values therebetween.

The binder may be combined with the cullet particles during formation of the particulate feedstock in a variety of ways. In one approach, the binder is dissolved or dispersed in an aqueous medium such as water or a water-based solution to yield a binder composition. The cullet particles and the binder composition are then mixed together to form a feedstock paste. The mixing together of the cullet particles and the binder solution can be carried out by first adding the cullet particles to a rotatable drum and then spraying the binder composition into the drum as the drum is being rotated. The addition of the binder composition to the rotating drum agglomerates the cullet particles into larger granules that together constitute the feedstock paste. Once produced, the feedstock paste is removed from the rotatable drum and dried to supply the particulate feedstock. Such drying removes the aqueous medium from the feedstock paste and leaves behind the binder. And, to help ensure that the resultant particulate feedstock has good flowability in the container preform forming step 16, the drying of the feedstock paste may be performed until the cullet particles as physically bound by the binder into larger amalgamated granules contain less than 10% moisture and, preferably, less than 5% moisture.

Next, in the container preform forming step 16, the particulate feedstock is formed into a hollow monolithic glass container preform without melting the cullet particles contained in the particulate feedstock. Indeed, upon being formed, the hollow monolithic glass container preform has a temperature above the glass transition temperature of the soda-lime-silica glass, but not exceeding 850° C., as a result of the sintering operations involved in transforming the particulate feedstock into the container preform. Several different ways exist for practicing the container preform forming step 16. One particular embodiment for practicing the preform forming step 16 is depicted in FIGS. 1 and 2A-3C and includes a pressing step 20, a sintering step 22, a mechanical deformation step 24, and an optional preheating step 26 between the pressing and the sintering steps 20, 22.

Figure 2A:
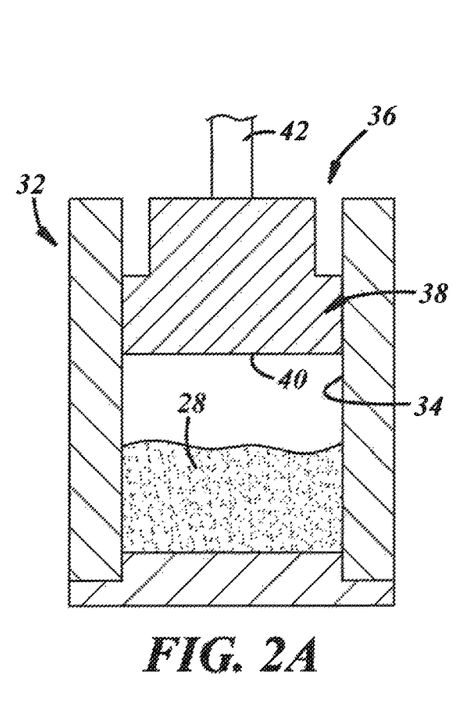
FIG. 2A is a side cross-sectional view of a generic die pressing apparatus showing the particulate feedstock loaded into a die cavity prior to being pressed by a retractable piston rod into a compressed solid green-body according to one embodiment of the disclosure.
Figure 2B:
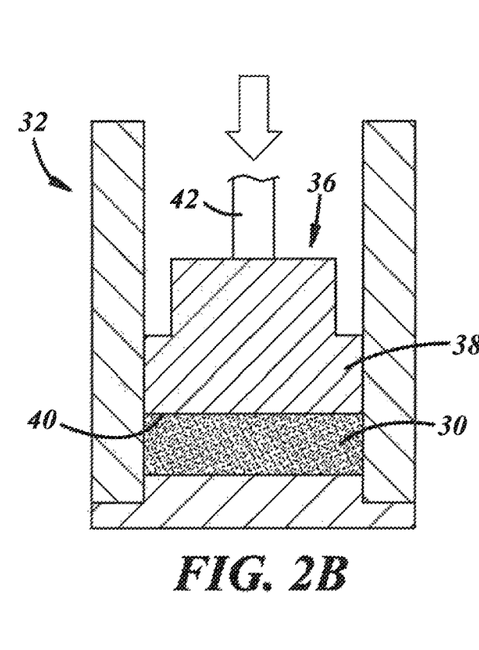
FIG. 2B is a side cross-sectional view of the generic die pressing apparatus showing the particulate feedstock being pressed by the piston rod into the compressed solid green-body according to one embodiment of the disclosure.
Figure 2C:
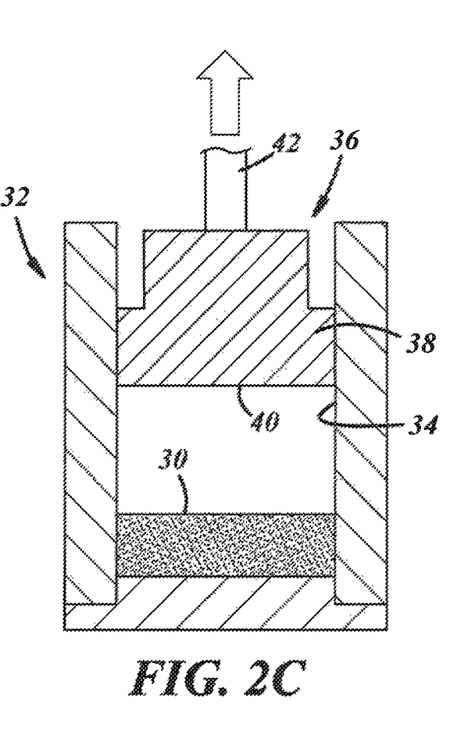
FIG. 2C is a side cross-sectional view of the generic die pressing apparatus showing the compressed solid green-body following retraction of the piston rod according to one embodiment of the disclosure.

In the pressing step 20, and with specific reference to FIGS. 2A-2C, the particulate feedstock (identified here by reference numeral 28) is pressed into a compressed solid green-body 30 in a die-pressing apparatus 32. To begin, the particulate feedstock 28 is loaded into in a die cavity 34 of the apparatus 32, as shown in FIG. 2A. The die cavity 34 here has a cylindrical cross-sectional shape. Once the particulate feedstock 28 is in place, a retractable piston rod 36 having a piston head 38 is inserted into the die cavity 34 such that the piston head 38 slides against and mates with the side walls that define the die cavity 34. The retractable piston rod 36 is advanced within the die cavity 34 to bring a front surface 40 of the piston head 38 into pressed engagement with the particulate feedstock 28 as shown in FIG. 2B. The piston head 38 is pressed against the particulate feedstock 28 at an applied downward pressure of, preferably, 45 MPa to 75 MPa for a time of 1 minute to 5 minutes using a hydraulic actuator 42. The compressive force applied by the piston head 38 compacts the particulate feedstock 28 into the compressed solid green-body 30 where the cullet particles are held together in a weak, yet portable, physically consolidated disc-shaped mass. After the requisite compression has been achieved, the piston rod 36 is retracted to separate the front surface 40 of the piston head 38 from the compressed solid green-body 30, as shown in FIG. 2C, and the green-body 30 is removed from the die-pressing apparatus 32.

The compressed solid green-body 30 is then sintered into a solid monolithic glass body 44 (FIG. 3A) of approximately the same disc shape in the sintering step 22. The sintering process includes heating the compressed solid green-body 30 to fuse the cullet particles—and thus the overall green-body 30—together into the solid monolithic glass body 44 by way of a solid-state particle softening and high viscosity flow mechanism without melting the cullet particles to the point of liquefaction or causing recrystallization (i.e., no nucleation and crystal growth) through prolonged heating. As such, the solid monolithic glass body 44 that results from the sintering step 22 is an amorphous unitary block of heated soda-lime-silica glass that resembles the shape of its precursor compressed solid green-body 30 albeit with a greater density. The heating that typifies the sintering step 22 may be conducted in a belt-type furnace or oven, such as a lehr, to facilitate more efficient manufacturing cycle times, although other heating techniques and apparatuses may certainly be employed.

The compressed solid green-body 30 may be heated to a sintering temperature above the glass transition temperature of the soda-lime-silica glass being made, but not exceeding 850° C., and held at that temperature for a period of time to carry out the sintering step 22. For example, in a preferred embodiment, the compressed solid green-body 30 may be heated at a rate of 10° C./min to 20° C./min until it reaches a sintering temperature between 675° C. to 850° C. or, more narrowly, between 700° C. to 750° C., at which point the green-body 30 (a term which includes any transition phase between the green-body 30 and the solid monolithic glass body 44) may be held at the sintering temperature for a period of 1 minute to 60 minutes. The sintering step 22 may be preceded by the optional preheating step 26 in order to burn off any binder, if present in the green-body 30, as well as other foreign contaminant matter that may have survived the pulverization step 20 including organics, adhesive residues, paper, and other non-glass remnants originally contained in the ecology cullet and/or single source cullet. This optional preheating step 26 may involve initially heating the compressed solid green-body 30 to a burn-off temperature between 450° C. to 550° C. and holding the green-body 30 at the burn-off temperature for a period of 15 minutes to 60 minutes and, thereafter, continuing to heat the compressed solid green-body 30 up to the sintering temperature as described above.

The solid monolithic glass body 44 produced in the sintering step 22 is then mechanically deformed into the hollow monolithic glass container preform (identified now by reference numeral 46 (FIG. 3C)) in the mechanical deformation step 24. The mechanical deformation step 24 may include hot-pressing the solid monolithic glass body 44 into the glass container preform 46 in a hot-stamping apparatus 48. In this regard, as shown in FIG. 3A, the solid monolithic glass body 44 is transferred into a mold cavity 50 of the hot-stamping apparatus 48 while still at an elevated temperature above the glass transition temperature of the soda-lime-silica glass as a result of being heated during the sintering step 22. In some embodiments, the mold cavity 50, as shown, may be defined by a convex surface 52 of a bottom plate 54 and an upstanding peripheral surface 56 of a side wall 58 that is affixed to and surrounds a circumference of the bottom plate 54. The side wall 58 may additionally be outfitted with a neck ring 60 having one or more intrusions 62 such as, for example, a continuous helical groove. The neck ring 60 may be installed in the side wall 58 to provide the peripheral surface 56 with the profile needed to create a neck finish on the exterior surface of the top of the hollow glass article 84 so that a closure member (not shown) can be twisted on and secured to the container-shaped article 84.

Once the solid monolithic glass body 44 is located in the mold cavity 50, a retractable plunger or mandrel 64 is inserted into the mold cavity 50 while being centrally guided by a guide ring 66 located adjacent to the opening of the mold cavity 50 within the side wall 58. The plunger 64 is advanced against the solid monolithic glass body 44 within the mold cavity 50 to force the glass body 44 to flow and deform up and around the plunger 64 so as to occupy the available space between the plunger 64 and the upstanding peripheral surface 56 of the side wall 58, as shown in FIG.

3B. To accomplish such mechanical deformation at an acceptable deformation rate, the plunger 64 may apply a downward pressure against the solid monolithic glass body 44 of, preferably, 10 MPa to 20 MPa for a time period of 10 seconds to 2 minutes while the bottom plate 54 and the side wall 58 of the hot-stamping apparatus are maintained at a temperature between 600° C. and 750° C. The forcible downward pressure applied by the plunger 64 may be delivered by a hydraulic actuator 68 that acts on the plunger 64 through a ram extender 70. After the solid monolithic glass body 44 has been deformed into the hollow monolithic glass container preform 46, the plunger 64 is retracted, as shown in FIG. 3C, and the glass container preform 46 is removed from the hot-stamping apparatus 48.

The hollow monolithic glass container preform 46 is formed of the same unitary amorphous soda-lime-silica glass as the solid monolithic glass body 44 albeit in a container shape that includes a wall 72 defining an interior containment space 74 and an opening 76 to the interior containment space 74 as shown in FIG. 5. The wall 72 of the glass container preform 46 is thus a shaped, three-dimensional structure constructed from monolithic soda-lime-silica glass whose temperature is still above the glass transition temperature of the soda-lime-silica glass but not higher than 850° C. The container shape assumed by the glass container preform 46 at this point is identical or nearly identical to the container shape and profile of the hollow glass article 84 except for some marginal thermal contraction that may occur during the cooling step 18 and which generally cannot be visually detected by human eyesight. The container shape may assume a wide variety of configurations associated with partially-formed containers and finished containers.

In one specific embodiment, as shown here in FIG. 5, the wall 72 of the hollow monolithic glass container preform 46 may include a main body 78 and a neck 80. The main body 78 includes a bottom wall 78*a* and a side wall 78*b* as dictated by the contours of the mold cavity 50 of the hot-stamping apparatus 48. Indeed, the bottom wall 78*a* is bowed into the interior containment space 74 in complimentary conformance to the convex surface 52 of a bottom plate 54, and the side wall 78*b* extends upwardly from a periphery of the bottom wall 78*a* to the neck 80 in complimentary conformance to the upstanding peripheral surface 56 of the side wall 58 beneath the neck ring 60. The neck 80 may be contiguous with the main body 78 and is the distal portion of the wall 72 that defines the opening 76 to the interior containment space 74. The neck 80 may have one or more external protrusions 82 that are shaped inversely to the one or more intrusions 62 contained in the neck ring 60. For example, as shown, the neck 80 may include a continuous protruding helical thread around its outer circumference. A variety of other intruding or protruding surface features may also be fashioned into the main body 78 or the neck 80 of the hollow monolithic glass container preform 46 including knurling, embossing, lettering, etc.

The container preform cooling step 18 is performed after the formation of the hollow monolithic glass container preform 46 in the container preform forming step 16. During the container preform cooling step 18, the hollow monolithic glass container preform 46 is cooled from its elevated temperature into the hollow, amorphous soda-lime-silica glass article 84 while retaining the previously-established container shape-namely, a wall 72' that defines an interior containment space 74' and an opening 76' to the interior containment space 74'. The cooling of the monolithic glass container preform 46 into the hollow container-shaped glass article 84 may involve cooling the preform 46 at a controllable rate of 2° C./min to 10° C./min until it reaches room temperature (i.e., 23° C.), although other time-temperature cooling practices may be used. Depending on the type and size of the cullet particles incorporated into the particulate feedstock 28, as well as other factors, the appearance of the hollow container-shaped glass article 84 may range from transparent, much like melt-processed glass articles, to opaque (e.g., black, grey, ivory, etc.) to multi-colored. And, in terms of its density and mechanical properties, the hollow container-shaped glass article 84 as manufactured by the disclosed method 10 compares satisfactorily to glass articles made by conventional melt processing. The wall 72' of glass article 84 may, for example, have a density of at least 95% and, usually, at least 99%, of the theoretical density of glass formed by the melt processing route, and may further have a median flexural strength of at least 50 MPa and good fracture toughness.

As mentioned above, there is more than one way to carry out the container preform forming step 16 between the particulate feedstock incorporation step 14 and the container preform cooling step 18. Referring now to FIG. 1 and FIGS. 4A-4C, there is shown a second embodiment of the container preform forming step 16 that includes a pressing step 90, a sintering step 92, and an optional preheating step 94 between the pressing and the sintering steps 90, 92. Here, in this embodiment, the pressing and sintering steps 90, 92 are performed in a way that obviates the need to practice a mechanical deformation step similar to the one described above. The pulverizing step 12, the particulate feedstock incorporation step 14, and the container preform cooling step 18 are all performed in conjunction with the second embodiment of the container preform forming step 16 in the same manner as described above.

The pressing step 90 of this embodiment is different than the pressing step 20 of the previous embodiment in that the particulate feedstock 28 is pressed into a compressed hollow green-body 96 (FIG. 4C), which corresponds in size and shape to the hollow monolithic glass container preform 46, as opposed to the compressed solid green-body 30. This step 90 may be performed in a mold cavity 98 of a cold-stamping apparatus 100 that has essentially the same components and functionality as the hot-stamping apparatus 48 shown in FIGS. 3A-3C except that the apparatus 98 is not heated during operation. Specifically, the mold cavity 98 may be defined by a convex surface 102 of a bottom plate 104 and an upstanding peripheral surface 106 of a side wall 108 that is affixed to and surrounds a circumference of the bottom plate 104. The side wall 108 may be additionally outfitted with a neck ring 110, which includes one or more intrusions 112, and a guide ring 114 for the same reasons as before. When using the cold-stamping apparatus 100 to form the compressed hollow green-body 96, the particulate feedstock 28 preferably includes a binder to help the green-body 96 retain its shape upon removal from the apparatus 100.

The pressing step 90 begins by first loading the particulate feedstock 28 into the mold cavity 98 of the cold-pressing apparatus 100 as shown in FIG. 4A. A retractable plunger or mandrel 116 is then inserted into the mold cavity 98 while being centrally guided by the guide ring 114 located adjacent to the opening of the mold cavity 98 within the side wall 108. The plunger 116 is pressed against the particulate feedstock 28 within the mold cavity 98 to force the particulate feedstock 26 up and around the plunger 116 and to compress it between the plunger 116 and the surfaces 102, 106 that define the mold cavity 98, as shown in FIG. 4B. The plunger 64 may be pressed against the particulate feedstock 28 at an applied downward pressure of, preferably, 60 MPa to 100 MPa for a time period of 15 seconds to 2 minutes in order to impart sufficient green strength to the compressed hollow green-body 96. The forcible downward pressure applied by the plunger 116 may be delivered by a hydraulic actuator 118 that acts on the plunger 116 through a ram extender 120. After the particulate feedstock 28 has been pressed into the compressed hollow green-body 96, the plunger 116 is retracted, as shown in FIG. 4C, and the green-body 96 is removed from the cold-stamping apparatus 100.

The compressed hollow green-body 96 may be sintered in basically the same way and under the same conditions as described in the earlier embodiment to carry out the sintering step 92. That is, the compressed hollow green-body 96 is heated, preferably in a belt-type furnace or oven, to a sintering temperature above the glass transition temperature of the soda-lime-silica glass, but not exceeding 850° C., and held at that temperature for a period of time (e.g., 1 minute to 60 minutes). During this time, the cullet particles—and thus the overall green-body 96—fuse together by way of a solid-state particle softening and high viscosity flow mechanism without melting the cullet particles to the point of liquefaction or causing recrystallization (i.e., no nucleation and crystal growth). In this embodiment of the container preform forming step 16, however, the compressed hollow green-body 96 is sintered directly into the hollow monolithic glass container preform 46 with its specified container shape due primarily to the fact that the green-body 96 already possesses a near-net three-dimensional version of the container shape. Moreover, as before, the sintering step 92 may be preceded by the optional preheating step 96 to burn off any binder or foreign contaminant matter that may be present in the particulate feedstock 28. The optional preheating step 96 may be performed in the same way and under the same conditions as before.

There thus has been disclosed a method of manufacturing a hollow container-shaped glass article composed of soda-lime-silica glass that avoids the melt processing route traditionally employed in soda-lime-silica glass manufacturing operations and fully satisfies one or more of the objects and aims previously set forth. The disclosure has been presented in conjunction with several illustrative embodiments, and additional modifications and variations have been discussed. Other modifications and variations readily will suggest themselves to persons of ordinary skill in the art in view of the foregoing discussion. For example, the subject matter of each of the embodiments is hereby incorporated by reference into each of the other embodiments, for expedience. The disclosure is intended to embrace all such modifications and variations as fall within the spirit and broad scope of the appended claims.

The invention claimed is:

1. A method of making a hollow glass article composed of soda-lime-silica glass, wherein the soda-lime-silica glass has a composition that comprises 60 wt % to 80 wt % $SiO_2$, 8 wt % to 18 wt % $Na_2O$, and 5 wt % to 15 wt % CaO, and further has a glass transition temperature between 510° C. and 600° C., the method comprising:

pulverizing soda-lime-silica cullet to obtain cullet particles of reduced particle size;

incorporating the cullet particles into a particulate feedstock;

forming the particulate feedstock into a hollow monolithic glass container preform without melting the cullet particles, the hollow monolithic glass container preform having a temperature above the glass transition temperature of the soda-lime-silica glass, but not exceeding 850° C., and further having a container shape that includes a wall defining an interior containment space and an opening to the interior containment space; and cooling the hollow monolithic glass container preform into a hollow, amorphous soda-lime-silica glass article that retains the container shape.

2. The method set forth in claim 1, wherein the particulate feedstock comprises at least 95 wt % of cullet particles.

3. The method set forth in claim 1, wherein the particulate feedstock is 100 wt % of cullet particles.

4. The method set forth in claim 1, wherein the soda-lime-silica cullet comprises ecology cullet.

5. The method set forth in claim 4, wherein the cullet particles have particle sizes of 120 μm or less.

6. The method set forth in claim 5, wherein the cullet particles are separated from cullet particles of nonconforming size with a sieve having a size 140 mesh.

7. The method set forth in claim 1, wherein the particulate feedstock comprises cullet particles and a binder.

8. The method set forth in claim 1, wherein forming the particulate feedstock into the hollow monolithic glass container preform comprises:

pressing the particulate feedstock into a compressed solid green-body;

sintering the compressed solid green-body at a sintering temperature above the glass transition temperature of the soda-lime-silica glass, but not exceeding 850° C., to fuse the compressed solid green-body into a solid monolithic glass body without causing recrystallization within the glass body; and mechanically deforming the solid monolithic glass body into the hollow monolithic glass container preform.

9. The method set forth in claim 8, wherein incorporating the cullet particles into the particulate feedstock comprises:

mixing the cullet particles with a binder composition to form a feedstock paste, the binder composition including a binder dispersed in an aqueous medium; and drying the feedstock paste to reduce its moisture content and thereby produce the particulate feedstock in which the cullet particles are physically bound by the binder into larger granules.

10. The method set forth in claim 9, further comprising:

heating the compressed solid green-body to a temperature below the sintering temperature of soda-lime-silica glass to burn off the binder prior to sintering the compressed solid green-body.

11. The method set forth in claim 8, wherein mechanically deforming the solid monolithic glass body into the hollow monolithic glass container preform comprises:

hot-pressing the solid monolithic glass body in a mold cavity by advancing a retractable plunger into the glass body to force the glass body to deform up and around the plunger into the hollow monolithic glass container preform.

12. The method set forth in claim 1, wherein forming the particulate feedstock into a hollow monolithic glass container preform comprises:

pressing the particulate feedstock into a compressed hollow green-body that corresponds in size and shape to the hollow monolithic glass container preform; and sintering the compressed hollow green-body at a sintering temperature above the glass transition temperature of the soda-lime-silica glass, but not exceeding 850° C., to fuse the compressed hollow green-body into the hollow monolithic glass container preform without causing recrystallization within the hollow monolithic glass container preform.

13. The method set forth in claim 12, wherein incorporating the cullet particles into the particulate feed stock comprises:
   mixing the cullet particles with a binder composition to form a feedstock paste, the binder composition including a binder dispersed in an aqueous medium; and
   drying the feedstock paste to reduce its moisture content and thereby produce the particulate feedstock in which the cullet particles are physically bound by the binder into larger granules.

14. The method set forth in claim 1, wherein the hollow, amorphous soda-lime-silica glass article is a parison, and the method further comprises enlarging the parison into a finished container.

15. A method of making a hollow glass article composed of soda-lime-silica glass, wherein the soda-lime-silica glass has a composition that comprises 60 wt % to 80 wt % $SiO_2$, 8 wt % to 18 wt % $Na_2O$, and 5 wt % to 15 wt % CaO, and further has a glass transition temperature between 510° C. and 600° C., the method comprising:
   incorporating soda-lime-silica cullet particles into a particulate feedstock;
   pressing the particulate feedstock into a compressed solid green-body;
   sintering the compressed solid green-body at a sintering temperature above the glass transition temperature of the soda-lime-silica glass, but not exceeding 850° C., to fuse the compressed solid green-body into a solid monolithic glass body without causing recrystallization within the glass body;
   mechanically deforming the solid monolithic glass body into a hollow monolithic glass container preform having a container shape that includes a wall defining an interior containment space and an opening to the interior containment space; and
   cooling the hollow monolithic glass container preform into a hollow, amorphous soda-lime-silica glass article that retains the container shape.

16. The method set forth in claim 15, wherein the particulate feedstock is 100 wt % of cullet particles.

17. The method set forth in claim 15, wherein the soda-lime-silica cullet comprises ecology cullet and the cullet particles obtained from pulverizing the soda-lime-silica ecology cullet have particle sizes of 120 μm or less.

18. The method set forth in claim 15, further comprising pulverizing soda-lime-silica cullet to obtain the cullet particles.

19. The method set forth in claim 18, wherein pulverizing the soda-lime-silica cullet comprises jaw crushing the of soda-lime-silica cullet.

20. The method set forth in claim 15, wherein incorporating the cullet particles into the particulate feedstock comprises:
   mixing the cullet particles with a binder composition to form a feedstock paste, the binder composition including a binder dispersed in an aqueous medium; and
   drying the feedstock paste to reduce its moisture content and thereby produce the particulate feedstock in which the cullet particles are physically bound by the binder into larger granules.

21. The method set forth in claim 15, further comprising:
   heating the compressed solid green-body to a temperature below the sintering temperature to burn off the binder prior to sintering the compressed solid green-body.

22. The method set forth in claim 15, wherein pressing the particulate feedstock into a compressed solid green-body comprises hydraulically pressing the particulate feedstock in a die cavity.

23. The method set forth in claim 15, wherein sintering the compressed solid green-body into the solid monolithic glass body comprises:
   heating the compressed solid green-body to a temperature between 675° C. and 850° C. for up to 60 minutes to fuse the solid-green body into the solid monolithic glass body.

24. The method set forth in claim 15, wherein mechanically deforming the solid monolithic glass body into the hollow monolithic glass container preform comprises:
   hot-pressing the solid monolithic glass body in a mold cavity by advancing a retractable plunger into the glass body to force the glass body to deform up and around the plunger into the hollow monolithic glass container preform.

25. A method of making a hollow glass article composed of soda-lime-silica glass, wherein the soda-lime-silica glass has a composition that comprises 60 wt % to 80 wt % $SiO_2$, 8 wt % to 18 wt % $Na_2O$, and 5 wt % to 15 wt % CaO, and further has a glass transition temperature between 510° C. and 600° C., the method comprising:
   incorporating soda-lime-silica cullet particles into a particulate feedstock;
   pressing the particulate feedstock into a compressed hollow green-body;
   sintering the compressed hollow green-body at a sintering temperature above the glass transition temperature of soda-lime-silica glass, but not exceeding 850° C., to fuse the compressed hollow green-body into the hollow monolithic glass container preform without causing recrystallization within the hollow monolithic glass container preform, the hollow monolithic glass container preform having a container shape that includes a wall defining an interior containment space and an opening to the interior containment space; and
   cooling the hollow monolithic glass container preform into a hollow, amorphous soda-lime-silica glass article that retains the container shape.

* * * * *